United States Patent
Kamma

(10) Patent No.: US 11,488,203 B2
(45) Date of Patent: Nov. 1, 2022

(54) SYSTEM AND A METHOD FOR IDENTIFYING PROSPECTS WITH A BUYING INTENT AND CONNECTING THEM WITH RELEVANT BUSINESSES

(71) Applicant: SocialMiningAi, Inc., San Antonio, TX (US)

(72) Inventor: Sridhar Kamma, San Antonio, TX (US)

(73) Assignee: SOCIALMININGAI, INC., San Antonio, TX (US)

( * ) Notice: Subject to any disclaimer, the term of this patent is extended or adjusted under 35 U.S.C. 154(b) by 0 days.

(21) Appl. No.: 16/121,271

(22) Filed: Sep. 4, 2018

(65) Prior Publication Data

US 2019/0236645 A1    Aug. 1, 2019

Related U.S. Application Data

(60) Provisional application No. 62/625,258, filed on Feb. 1, 2018.

(51) Int. Cl.
  *G06Q 30/00*    (2012.01)
  *G06Q 30/02*    (2012.01)
  *G06N 3/08*    (2006.01)

(52) U.S. Cl.
  CPC .......... *G06Q 30/0254* (2013.01); *G06N 3/08* (2013.01)

(58) Field of Classification Search
  None
  See application file for complete search history.

(56) References Cited

U.S. PATENT DOCUMENTS

| | | | |
|---|---|---|---|
| 10,540,660 B1* | 1/2020 | Smith | G06Q 30/00 |
| 2006/0282328 A1* | 12/2006 | Gerace | G06F 16/9535 |
| | | | 705/14.66 |
| 2008/0162268 A1 | 7/2008 | Gilbert | |
| 2011/0295688 A1* | 12/2011 | Shen | G06Q 30/0255 |
| | | | 705/14.54 |
| 2013/0054376 A1* | 2/2013 | Ross | G06Q 30/0251 |
| | | | 705/14.66 |

(Continued)

OTHER PUBLICATIONS

Sahoo et al., Learning Deep Neural Network on the Fly, 2017, www.arxiv.org (Year: 2017).*
Zhu et al., What to do next—Modeling user behaviors by Time-LSTM, May 4, 2017, www.ijcai.org (Year: 2017).*

(Continued)

*Primary Examiner* — Naresh Vig
(74) *Attorney, Agent, or Firm* — Shah IP Law, PLLC

(57) ABSTRACT

A system and method for identifying prospects with a buying intent and connecting them with relevant businesses. An example method may comprise obtaining a training dataset; applying a first scoring algorithm to obtain a first score for each entry in the training dataset; receiving one or more scores from a user for one or more entries in the training dataset; rescoring the training dataset based on the one or more scores received from the user; creating a deep learning model based on the rescored dataset; obtaining digital media posts comprising data from one or more digital media platforms; scoring each received digital media post by using the deep learning model; providing certain scored digital media posts to the user; receiving a second score from the user; and updating the deep learning model based on the second score.

9 Claims, 7 Drawing Sheets

(56) References Cited

U.S. PATENT DOCUMENTS

| | | | | |
|---|---|---|---|---|
| 2014/0074610 | A1* | 3/2014 | Bilange | G06Q 50/01 |
| | | | | 705/14.58 |
| 2016/0171534 | A1* | 6/2016 | Linden | G06Q 30/0255 |
| | | | | 705/14.53 |
| 2016/0171535 | A1* | 6/2016 | Linden | G06Q 30/0255 |
| | | | | 705/14.53 |
| 2016/0217515 | A1 | 7/2016 | Vijayaraghavan | |
| 2017/0024640 | A1* | 1/2017 | Deng | G06N 3/04 |
| 2017/0262635 | A1* | 9/2017 | Strauss | G06F 21/10 |
| 2017/0329881 | A1* | 11/2017 | Korada | G06Q 30/0251 |
| 2017/0345054 | A1* | 11/2017 | Sinha | G06Q 30/0201 |
| 2018/0150851 | A1 | 5/2018 | Ouimet | |
| 2018/0285691 | A1 | 10/2018 | Grindstaff | |
| 2018/0349347 | A1* | 12/2018 | Ringger | G06F 16/90324 |
| 2018/0357676 | A1* | 12/2018 | Lautenberg | G06Q 30/0277 |
| 2019/0164082 | A1* | 5/2019 | Wu | G06N 20/00 |

OTHER PUBLICATIONS

DeepLizard, Training a Neural Network explained, Nov. 22, 2017, Youtube (https://www.youtube.com/watch?v=sZAlS3_dnk0) (Year: 2017).*

Vitaly Bushaev, How do we train Neural Networks?, Nov. 27, 2017, Towards Data Science (Year: 2017).*

Dr. Farid et al., Assigning Weights to Training Instances Increases Classification Accuracy, Jan. 2013, International Journal of Data Mining & Knowledge Management Process (IJDKP), vol. 3, No. 1 (Year: 2013).*

Langley et al., Approaches to Machine Learning, Feb. 16, 1984, Carnegie-Mellon University (Year: 1984).*

Jason Brownlee, Supervised and Unsupervised Machine Learning Algorithms, Mar. 16, 2016, MachineLearningMastery.com (Year: 2016).*

Chen Xin, Blog as communication tool, 2009, IEEE, pp. 584-587 (Year: 2009).*

\* cited by examiner

SYSTEM AND A METHOD FOR IDENTIFYING PROSPECTS WITH A BUYING INTENT AND CONNECTING THEM WITH RELEVANT BUSINESSES

CROSS-REFERENCE TO RELATED APPLICATIONS

This application claims priority to U.S. Provisional Application No. 62/625,258 entitled "Qualified Prospects Generation Service that Connects Businesses with Real-Time Prospective Customers by using Artificial Intelligence," filed Feb. 1, 2018, which is incorporated by reference in its entirety herein.

BACKGROUND

Field of the Art

The present subject matter relates generally to advertising. More specifically, the present subject matter relates to targeted digital advertising.

Discussion of the State of the Art

Digital media advertisers today use significant amount of digital data to target advertisements to prospects who may be interested in purchasing a product or a service offering. Specifically, digital media advertisers use demographic, behavior, and social networking data from digital media platforms and social media networks to identify users who may find a particular advertisement to be relevant.

Although these methodologies tend be more targeted than the methodologies of the past, such as advertising in a phone book or on a billboard, the current technology still suffers from an inherent problem: advertisers are still targeting prospects based on one or more inferences about the likelihood that a prospect may purchase a product or a service offering. As a result, today's ad targeting technologies, although better, are still effectively guessing as to a prospect's desires. Therefore, today's ad targeting technologies are not very effective at placing the right advertisements in front of the right prospects at the right time (at the time that a decision to make a purchase is manifested).

The problems associated with current ad targeting technologies are exacerbated by the technical difficulties in processing digital data to gain intelligence from it. Indeed, to be effective, today's ad targeting systems must classify and analyze massive amounts of varied digital data including a user's behavior data, such as site visits, emails received and opened, etc., social networking data, such as likes, connections to people or pages, follows, etc., and demographic data related to the user and the user's cohort. Moreover, these systems also require access to significant amount of storage that must be accessed quickly to make real-time or near real-time decision about whether to serve an advertisement to a user.

Even if the significant technical challenges are overcome, the costs associated with making ad targeting decisions are often prohibitively high. For example, an advertiser who wants to target his or her ads to a particular type of user must typically employ data scientists to create complex analysis and insights systems. Once created, these systems must continually be reevaluated by data scientists for effectiveness in light of changing data and changing consumer sentiments. Moreover, the computing costs associated with making targeting decisions are also going up. Although computing systems to run complex machine learning and artificial intelligence systems may be rented today, it is still very expensive to create prediction models and use the models to make predictions because computing system vendors often charge per prediction or per hour of compute time. Finally, the cost of advertising on various digital platforms, such as various social media channels, have gone up significantly in recent years due to the increasing popularity of these channels and the large number of users who frequent these digital communities. All of these trends have caused targeted advertisements to become more expensive, thereby leading to a lower return on investment.

In addition to the significant technical challenges and related expenses, the current social and regulatory environment represents another significant challenge to effectively target prospects for digital advertisements. In today's environment, users and digital media platforms are increasingly becoming more sensitive to the use of demographic and/or behavior data by advertisers. As a result, many individual users, and digital media platforms have restricted access to data that used to be readily available to advertisers. Moreover, governments and regulators are increasingly passing rules and regulations that restrict the type of data that advertisers may have access to. Thus, advertisers having less data to make inferences about the likelihood that a user will purchase a product or a service offering, thereby reducing the effectiveness of advertisements in these channels.

What is needed is a new and a more effective way to target prospects for advertisements or offerings. Moreover, in order to be successful in today's environment, the new technology must overcome many of the technical challenges associated with processing large sets of data, reduce costs, and reduce reliance on data that may be perceived as private or otherwise sensitive.

SUMMARY

The present invention, as disclosed herein, uses models based on machine learning and client feedback to determine when a digital media communication (e.g., post, comment, thread, reply, tweet, image, meme, etc.) from a user indicates that the user is interested in a product and/or service offered by a client. Generally, and as described in greater detail below, the present invention allows digital advertisers to know whether a user has decided to make a purchase related to a product or a service offering (as opposed to making an inference about a user's preferences based on related digital media data).

In one embodiment of the invention, the approach the present disclosure takes may comprise training a model to identify a digital media communication that expresses an intent to buy a product and/or service. The model may be trained on a training set of digital media communications. The training set may be provided to a client. Input from the client may be used to retrain (e.g., recalibrate, etc.) the model. A new digital media communication may be selected by the model as indicating that a user intends to buy a product and/or service. The new digital media communication may be provided to the client as part of a feedback loop. The client may provide a new input associated with the new digital media communication as part of the feedback loop. The new client input may be used to update the model as part of the feedback loop.

The present invention overcomes technical challenge and reduces costs associated with identifying prospects in digital media environments. As described in greater detail below, the present invention reduces the amount of computing resources that may be necessary for otherwise analyzing large sets of data to make real-time or near real-time decisions about whether a user or a prospect may be a good target for a product or a service offering. In addition, the present invention reduces the cost and complexity associated with making real-time or near real-time decisions about whether a user or a prospect is a good target for a product or a service offering.

The present invention also and minimizes or eliminates the use of digital data that may be perceived as private or sensitive in nature. For example, the present invention does not rely on inferences based on a data that is related to a user, such as the user's behavior, and related social media data, to serve advertisements to the user. Instead, the present invention analyzes specific public actions taken by a user to determine if a user has manifested an intent to make a purchase that is related to a product or a service offering. As such, the present invention overcomes many of the challenges that are uniquely associated with data obtained from digital media platforms, social media platforms, and the like The present invention is much more than an attempt to co-opt an old business practice. Rather, the present invention specifically addresses technical and privacy challenges that are central to processing digital data for the purposes of identifying prospects who intend to make a purchase that is related to a product or a service offering. Indeed, digital media and its associated problems, some of which are outlined herein, are central to this invention, and, as such, the presented invention is necessarily rooted in computer technology. Moreover, the present invention entails an unconventional solution (identifying a manifest intent to make a purchase related to a product or a service offering— as opposed to inferring it from demographic, behavior, or social network data) to a technological problem (identifying relevant prospects without reviewing data that may be perceived as private or sensitive, and communicating with the prospect in a timely manner). Indeed, the invention is directed to communicating with the right prospects, about the right offering, at the right time while overcoming technical challenges associated with working with large datasets and the regulatory challenges associated with digital data privacy—it is not directed to digital data processing per se.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

Figure 1:
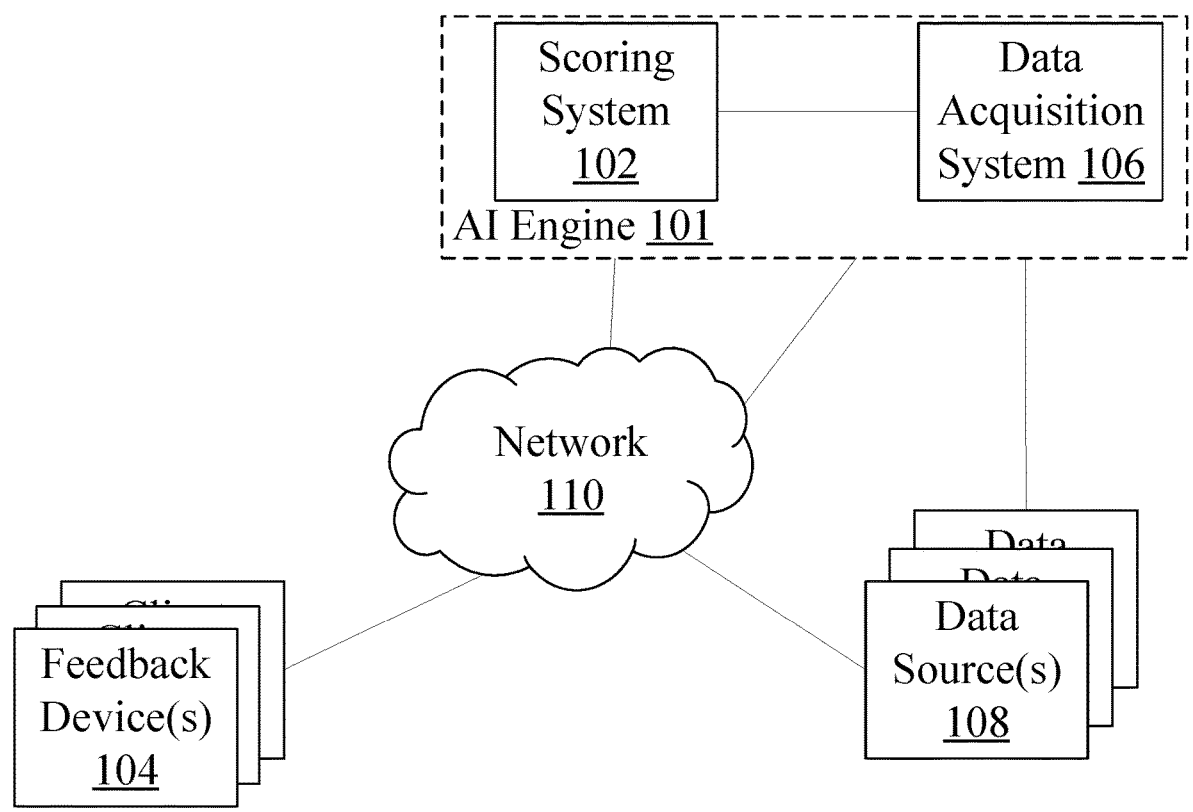
FIG. 1 is a block diagram illustrating an example operating environment, according to a preferred embodiment of the invention.

As noted above, in the above reference figures, the present invention is illustrated by way of example, not limitation, and modifications may be made to the elements illustrated therein, as would be apparent to a person of ordinary skill in the art, without departing from the scope of the invention.

DETAILED DESCRIPTION

The inventor has conceived, and reduced to practice, a system and method for identifying prospects with a buying intent and connecting them with relevant businesses.

The systems and/or methods described herein may comprise a computer program product comprising a non-transitory computer readable storage medium. The non-transitory computer readable storage medium may have instructions encoded thereon that, when executed by a processor, cause the processor to obtain a training dataset. The non-transitory computer readable storage medium may have instructions encoded thereon that, when executed by a processor, cause the processor to apply a first scoring algorithm to obtain a first score for each entry in the training dataset. The first score may indicate the likelihood that a prospective customer will buy an offering. The non-transitory computer readable storage medium may have instructions encoded thereon that, when executed by a processor, cause the processor to receive one or more scores from a user for one or more entries in the training dataset. The non-transitory computer readable storage medium may have instructions encoded thereon that, when executed by a processor, cause the processor to rescore the training dataset based on the one or more scores received from the user. The non-transitory computer readable storage medium may have instructions encoded thereon that, when executed by a processor, cause the processor to create a deep learning model based on the rescored dataset. The deep learning model may comprise a library of words, phrases, and contextual relationship between one or more items in the library indicating a likelihood that a prospective customer will purchase an offering. The non-transitory computer readable storage medium may have instructions encoded thereon that, when executed by a processor, cause the processor to obtain digital media posts comprising data from one or more digital media platforms. The non-transitory computer readable storage medium may have instructions encoded thereon that, when executed by a processor, cause the processor to score each received digital media post by using the deep learning model. The scores may indicate the likelihood that a customer will purchase an offering. The non-transitory computer readable storage medium may have instructions encoded thereon that, when executed by a processor, cause the processor to provide certain scored digital media posts to the user. The non-transitory computer readable storage medium may have instructions encoded thereon that, when executed by a processor, cause the processor to receive a second score from the user. The second score may indicate the likelihood that a customer will buy an offering based on the content of the digital media post. The non-transitory computer readable storage medium may have instructions encoded thereon that, when executed by a processor, cause the processor to update the deep learning model based on the second score.

The systems and/or methods described herein may comprise an example method. The example method may comprise obtaining a training dataset. The example method may comprise applying a first scoring algorithm to obtain a first score for each entry in the training dataset. The first score may indicate the likelihood that a prospective customer will buy an offering. The example method may comprise receiving one or more scores from a user for one or more entries in the training dataset. The example method may comprise rescoring the training dataset based on the one or more scores received from the user. The example method may comprise creating a deep learning model based on the rescored dataset. The deep learning model may comprise a library of words, phrases, and contextual relationship between one or more items in the library indicating a likelihood that a prospective customer will purchase an offering. The example method may comprise obtaining digital media posts comprising data from one or more digital media platforms. The example method may comprise scoring each received digital media post by using the deep learning model. The scores may indicate the likelihood that a customer will purchase an offering. The example method may comprise providing certain scored digital media posts to the user. The example method may comprise receiving a second score from the user. The second score may indicate the likelihood that a customer will buy an offering based on the content of the digital media post. The example method may comprise updating the deep learning model based on the second score.

The first scoring algorithm may use pre-identified keywords and deep learning to identify context suggesting a purchase intent associated with each entry, including whether the entry indicates a need for an offering, whether the need is immediate, or whether the entry requests a recommendation.

The digital media platforms may comprise one or more of digital social media platforms, digital message boards, and digital review collection systems.

Obtaining digital media posts may comprise using one or more of application programming interfaces (APIs) associated with one or more digital media platforms, and screen scraping and text recognition technologies.

The user may be provided scored digital media posts only if the posts are scored as having a high likelihood that a potential customer will purchase an offering.

The deep learning model may be updated with the second score if the second score indicates a low likelihood that a potential customer will purchase an offering.

The relationship used by the deep learning model may comprise the presence or absence of certain words or phrases in the library.

The relationship used by the deep learning model may comprise the order in which the words or phrases appear.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates a block diagram of an example operating environment 100. The example operating environment 100 may comprise an AI engine 101 comprising a scoring system 102, and a feedback device 104, a digital data acquisition system 106, one or more data sources 108 and a network 110.

Figure 5:
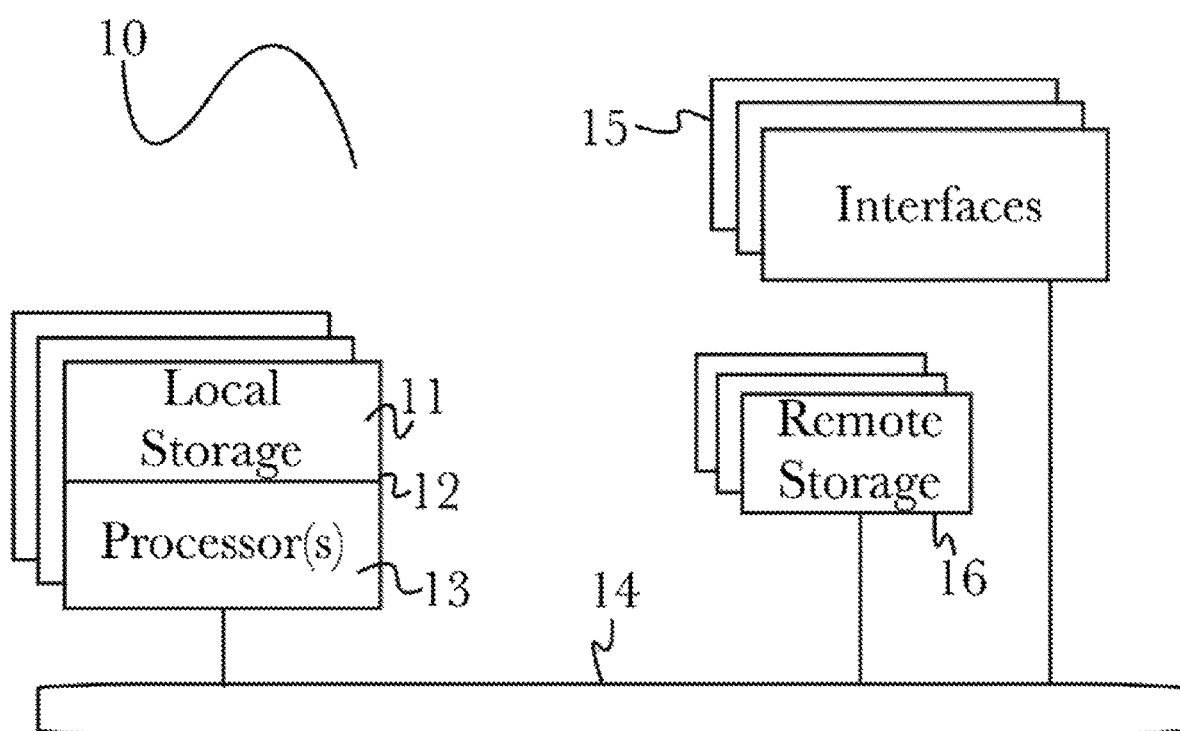
FIG. 5 is a block diagram illustrating an exemplary hardware architecture of a computing device, according to a preferred embodiment of the invention.

The scoring system 102 may comprise one or more computing devices, like the computing device 10 illustrated in FIG. 5 and/or the computer system 40 illustrated in FIG. 8. The scoring system 102 will be described in detail in reference to FIG. 2.

The feedback device 104 may comprise one or more computing devices, like the computing device 10 illustrated in FIG. 5 and/or the computer system 40 illustrated in FIG. 8. The feedback device 104 may comprise a smart mobile device, a laptop, a desktop, a smart wearable device, any computing device, and/or any combination of the foregoing. A client may interact with the scoring system 102 via the feedback device 104.

The digital data acquisition system 106 may comprise one or more computing devices, like the computing device 10 illustrated in FIG. 5 and/or the computer system 40 illustrated in FIG. 8. The digital data acquisition system 106 may retrieve digital media communications (e.g., posts, comments, threads, replies, tweets, images, memes, etc.) from the one or more data sources 108. For example, the digital data acquisition system 106 may retrieve the digital media communications by screen scraping the one or more data sources 108. The digital data acquisition system 106 may provide the retrieved digital media communications to the scoring system 102 and/or the feedback device 104.

The one or more data sources 108 may comprise one or more websites, web applications, mobile applications, digital media platforms, digital social media platforms, digital message boards, and digital review collection systems. The one or more data sources 108 may comprise applications executing on one or more computing devices, like the computing device 10 illustrated in FIG. 5 and/or the computer system 40 illustrated in FIG. 8. The one or more data sources 108 may comprise one or more computing devices, like the computing device 10 illustrated in FIG. 5 and/or the computer system 40 illustrated in FIG. 8. The one or more data sources 108 may comprise a distributed network (not shown) comprising servers and client devices. The one or more data sources 108 may comprise one or more of application programming interfaces (APIs). The digital data acquisition system 106 may use the one or more APIs to retrieve digital media communications from the one or more data sources 108.

The scoring system 102, the feedback device 104, and the digital acquisition system 106 may be connected via a network 110. The network 110 may comprise a wide area network (WAN). The network 110 may comprise a local area network (LAN). The network 110 may comprise a physical connection between two or more of the scoring system 102, the feedback device 104, and the digital data acquisition system 106. The network 110 may comprise a bus between two or more of the scoring system 102, the feedback device 104, and the digital data acquisition system 106. At least a portion of the network 110 may be private. At least a portion of the network 110 may be public, such as the Internet. The network 110 may be capable of transporting messages comprising one or more messaging protocol.

Figure 2:
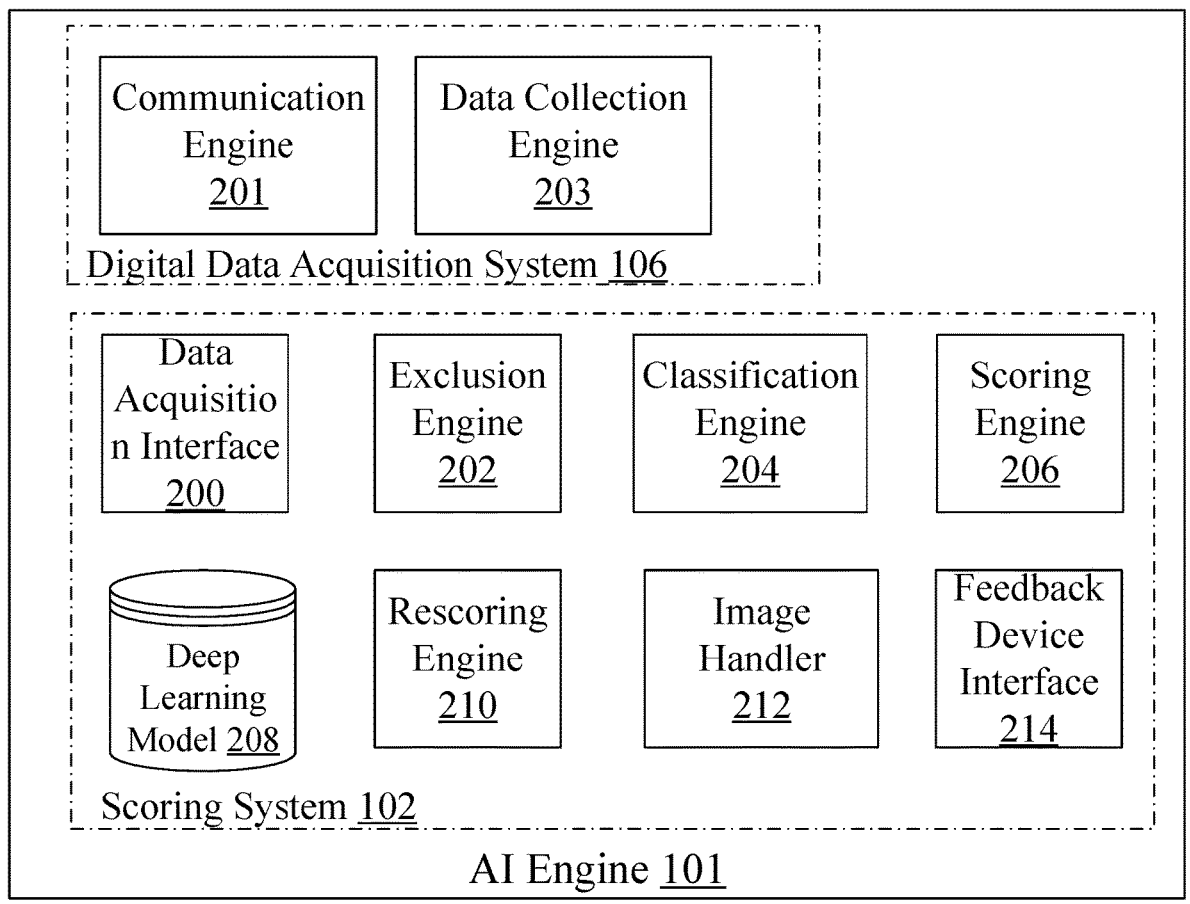
FIG. 2 is a block diagram illustrating an example scoring system, according to a preferred embodiment of the invention.

FIG. 2 illustrates a block diagram illustrating an exemplary AI engine 101 comprising a scoring system 102 and a digital data acquisition system 106.

The example scoring system 102 may comprise a digital data acquisition system interface 200, an exclusion engine 202, a classification engine 204, a scoring engine 206, a deep learning model 208, a rescoring engine 210, an image handler 212, and a feedback device interface 214.

The digital data acquisition system interface 200 may comprise one or more modules executing on one or more computing devices, like the computing device 10 illustrated in FIG. 5 and/or the computer system 40 illustrated in FIG. 8. The digital data acquisition system interface 200 may receive digital media communications from the digital data acquisition system 106 in FIG. 1. The digital data acquisition system interface 200 may receive multiple digital media communications, where a dataset, such as a training dataset, comprises the multiple digital media communications. The digital data acquisition system interface 200 may receive a single digital media communication. A digital media communication may comprise a post, a comment, an entry in a thread, a reply, a tweet, an image, a meme, etc. A digital media communication may comprise content from a questionnaire, a web form, a web search, a web scrapping, etc.

The exclusion engine 202 may comprise one or more modules executing on one or more computing devices, like the computing device 10 illustrated in FIG. 5 and/or the computer system 40 illustrated in FIG. 8. The exclusion engine 202 may exclude digital media communications based on one or more library of words, phrases, emoticons, etc. The one or more libraries may be provided, user-defined, or both. The exclusion engine 202 may filter all communications. For example, a library may comprise words, such as profanity, that would indicate a respective digital media communication is not appropriate to present as a sales lead. The exclusion engine 202 may filter communications with respect to an industry. For example, a library associated with automotive dealerships may indicate that digital media communications with the phrase "baseball card" should be excluded, so as to reduce false hits from digital media communications seeking baseball card dealers. The exclusion engine 202 may filter communications with respect to a particular client. For example, a library associated with a business in Dallas, Ga. may exclude digital media communications with the word "Texas."

The classification engine 204 may comprise one or more modules executing on one or more computing devices, like the computing device 10 illustrated in FIG. 5 and/or the computer system 40 illustrated in FIG. 8. The classification engine 204 may classify the digital media communications into one or more industries based on one or more libraries of words, phrases, emoticons, etc. The one or more libraries may be provided, user-defined, or both. For example, the classification engine 204 may classify digital media communications as relevant to real estate, health insurance, auto insurance, banking, etc. The classification engine 204 may classify the digital media communications based on North American Industry Classification System (NAICS) codes. The classification engine 204 may classify the digital media communications into NAICS codes. The classification engine 204 may learn new words and/or phrases for respective industries through machine learning.

The scoring engine 206 may comprise one or more modules executing on one or more computing devices, like the computing device 10 illustrated in FIG. 5 and/or the computer system 40 illustrated in FIG. 8. The scoring engine 206 may assign a score to each of the digital media communications, wherein the score may indicate a willingness of an author of a respective digital media communication to buy a product and/or service. The scoring engine 206 may use deep learning to determine a context in a digital media communication, and determine whether an originator of the digital media communication has a need, is looking for a product or service or recommendation, or even looking to purchase immediately. The scoring engine 206 may score a digital media communication on a general intent to purchase any product and/or service. For example, if a digital media communication comprises the phrase "I am looking to buy", then the digital media communication may receive a high, non-industry specific score. The scoring engine 206 may score a digital media communication on an intent to purchase an industry specific product and/or service. For example, if a digital media communication comprises the phrase "I am looking for a real estate agent", then the digital media communication may receive a high, industry specific (real estate) score.

The deep learning model 208 may comprise one or more modules executing on one or more computing devices, like the computing device 10 illustrated in FIG. 5 and/or the computer system 40 illustrated in FIG. 8. The deep learning model 208 may be trained using an initial training dataset of digital media communications. The deep learning model 208 may update other portions of the scoring system 102, such as the exclusion engine 202, the classification engine 204, the scoring engine 206, rescoring engine 210, the image handler 212, etc.

The feedback device interface 214 may comprise one or more modules executing on one or more computing devices, like the computing device 10 illustrated in FIG. 5 and/or the computer system 40 illustrated in FIG. 8. The feedback device interface 214 may comprise a mobile application. The feedback device interface 214 may comprise a web application. The feedback device interface 214 may allow the scoring system 102 to communicate with the client device 104 in FIG. 1. The scoring system 102 may receive one or more library entries specified by a user via the feedback device interface 214. The scoring system 102 may deliver digital media communications to the user via the feedback device interface 214. The scoring system 102 may receive feedback from the user regarding the digital media communications via the feedback device interface 214.

The rescoring engine 210 may comprise one or more modules executing on one or more computing devices, like the computing device 10 illustrated in FIG. 5 and/or the computer system 40 illustrated in FIG. 8. The rescoring engine 210 may rescore the digital media communications based on the feedback received via the feedback device interface 214. The rescoring engine 210 may update the deep learning model 208 based on the rescoring. In addition, the rescoring engine 210 may also update the exclusion engine 202 as described in greater detail below.

The rescoring engine 210 may comprise and/or be in communication with a natural language processing (NLP) model. The NLP model may comprise one or more modules executing on one or more computing devices, like the computing device 10 illustrated in FIG. 5 and/or the computer system 40 illustrated in FIG. 8. The NLP model may assign a score based on text in a digital media communication. The assigned score may indicate an intent of an author of the digital media communication to buy a product and/or service. The rescoring engine 210 may rescore a digital media communication based, at least in part, on an assigned score of the NLP model.

The image handler 212 may comprise one or more modules executing on one or more computing devices, like the computing device 10 illustrated in FIG. 5 and/or the computer system 40 illustrated in FIG. 8. The image handler 212 may determine if a digital media communication comprises an image. If the digital media communication does not comprise an image, then the image handler 212 may not do anything in relationship to the digital media communication. If the digital media communication comprises an image, then the image handler 212 may compare the image with a set of trained images to determine an image relevance. The set of trained images may comprise multiple image sets based on industry. The image handler 212 may assign a score based, at least in part, on the determined image relevance. The image handler 212 may assign a score based on a combination of the image relevance and text in the digital media communication. The rescoring engine 210 may comprise and/or be in communication with the image handler 212. The rescoring engine 210 may rescore a digital media communication based, at least in part, on an assigned score of the image handler 212. In one non-limiting example, the image handler 212 may be trained to identify images containing a 2017 model of Honda Accord. Once identified, the results may be passed on to the rest of the system. In one embodiment, if the digital media posts contains the words "going to buy my dream car this weekend" then the system may act on that information as containing a high buying intent in accordance with the disclosure herein. In other embodiments, the image hander 212 may be used solely to identify a buying intent and communicate with prospects in accordance with the disclosure herein.

The rescoring engine 210 may comprise and/or be in communication with a sentiment model. The sentiment model may comprise one or more modules executing on one or more computing devices, like the computing device 10 illustrated in FIG. 5 and/or the computer system 40 illustrated in FIG. 8. The sentiment model may determine likes and/or dislikes about a particular product and/or service. The sentiment model may be used to determine an appropriate offering incentive for an author of a particular digital media communication. The sentiment model may assign a score to a digital media communication based on a sentiment about a product and/or service. The rescoring engine 210 may rescore a digital media communication based, at least in part, on an assigned score of the sentiment model.

The rescoring engine 210, NPL model, image handler 212, sentiment model, and feedback device interface 214 may form a feedback loop. Digital media communication received via the digital data acquisition system interface 200 and scored via the scoring engine 206 may be rescored via the feedback loop.

Digital media communications that are scored and/or rescored above a threshold may be passed on to one or more relevant product and/or service providers (e.g., marketers, clients, etc.). Publicly available information about a contact (e.g., author, originator, etc.) associated with the digital media communications may be provided to the one or more relevant product and/or service providers. The digital media communications may be provided to the one or more relevant advertisers, product and/or service providers via the feedback device interface 214. The digital media communications may also be provided to the one or more relevant advertisers, product and/or service providers via a mobile application. The digital media communications may be provided to the one or more relevant advertisers, product and/or service providers via a web application. The one or more relevant advertisers, product and/or service providers may receive a prompt to send a pitch via a digital media communications. The pitch may comprise a communication regarding a product and/or service. The pitch may comprise an offering incentive for a product and/or service. The pitch may comprise an advertisement for a product and/or service.

For example, an automotive dealership may comprise an account with the scoring system 102. A user associated with the automotive dealership may create two libraries of keywords. A first library, associated with the exclusion engine 202, may comprise words, phrases, emojis, etc., which indicate a digital media communication should be excluded if the words, phrases, emojis, etc. of the first library are found in the digital media communication. For example, the user associated with the automotive dealership may indicate that "baseball card" should be in a library associated with the exclusion engine 202.

A second library, associated with the classification engine 204, may comprise words, phrases, emojis, etc., which indicate a digital media communication should be included if the digital media communication comprises anything found in the second library. In another embodiment, the scoring engine 206 may use the second library. In another embodiment, one or more portions of the feedback loop, such as the rescoring engine 210, may use the second library. As an example, the automotive dealership may indicate that "dealership" should be in the second library.

The digital acquisition system 106 may retrieve posts from a digital social media platform from an API associated with the digital social media platform. The posts may form a training dataset. A first post of the training dataset, for example, may read: "I'm looking for a baseball card dealership in San Antonio." A second post of the training dataset, for example, may read: "Can someone recommend a dealership?". A third post of the training dataset, for example, may read: "Thanks to Jessica for recommending Pegassi of San Andreas. Best experience with a car dealership."

The digital acquisition system 106 may provide the training dataset to the scoring system 102 via the network 110. The scoring system 102 may receive the training dataset via the digital data acquisition system interface 200. The scoring system 102 may give the training dataset an initial score. For example, the exclusion engine 202 may exclude the first post from the training dataset on the basis of the appearance of the phrase "baseball card". As another example, any posts that include vulgarity may be excluded from all training datasets. As another example, the classification engine 204 may classify the second post and the third post being relevant to the automotive dealership on the basis of the appearance of the word "dealership". As another example, the scoring engine 206 may give the second post and the third post scores indicating a high likelihood of intent to buy from the automotive dealership on the basis of the appearance of the words "recommend/recommending" and "dealership".

The scoring system 102 may provide the training dataset to the feedback device 104 via the feedback device interface 214. For example, the user associated with the automotive dealership may receive the training dataset at the feedback device 104. The scoring system 102 may receive feedback from the feedback device 104 via the feedback device interface 214. For example, the user associated with the automotive dealership may give feedback indicating that the second post indicates a high likelihood of intent to buy from the automotive dealership but the third post indicates a low likelihood of intent to buy from the automotive dealership.

The rescoring engine 210 may rescore the training dataset based on the feedback. For example, the rescoring engine 210 may rescore the second post with the same score. As another example, the rescoring engine 210 may rescore the third post with a lower score based on the feedback.

The rescoring engine 210 may update the deep learning model 208 based on the rescoring. For example, the deep learning model 208 may learn that if another automotive dealership is mentioned in a post, a likelihood of intent to buy from the automotive dealership is decreased based on the rescoring of the third post. As another example, the deep learning model 208 may learn that if gratitude towards a particular person is expressed in a post, a likelihood of intent to buy from the automotive dealership is decreased based on the rescoring of the third post. As another example, the deep learning model 208 may learn that if "recommend" and "dealership" do not appear in the same sentence, a likelihood of intent to buy from the automotive dealership is decreased based on the rescoring of the third post. As another example, the deep learning model 208 may learn that if another automotive dealership is not mentioned, if gratitude towards a particular person is not expressed, and if "recommend" and "dealership" appear in the same sentence, confidence in a high likelihood of intent to buy from the automotive dealership is increased based on the rescoring of the second and the third post.

The scoring system 102 may receive additional posts from the digital data acquisition system 106 via the digital data acquisition system interface 200. The additional posts may be scored by the scoring engine 206. Any of the additional posts that receive a score above a threshold may be provided to the feedback device 104 via the feedback device interface 214. The scoring system 102 may receive feedback from the feedback device 104 regarding the provided additional posts. The rescoring engine 210 may use the feedback to rescore the additional posts. The deep learning model 208 may be updated based on the rescoring of the additional posts.

For example, the digital data acquisition system 106 may retrieve an additional post that reads "That's the last time I ask someone here to recommend an automotive dealership for me!". The scoring system 102 may receive the additional post from the digital data acquisition system 106 via the digital data acquisition system 200. The scoring engine 206 may give the additional post a score that indicates a high likelihood of intent to buy from the automotive dealership. The additional post may be provided to the feedback device via the feedback device 104 interface 214. The user associated with the automotive dealership may give input that indicates that an author of the additional post has a low likelihood of intent to buy from the automotive dealership. The scoring system 102 may receive the user input for the additional post via the feedback interface 214. The rescoring engine 210 may rescore the additional post based on the user input. The deep learning model 208 may be updated based on the rescoring the additional post. For example, the deep learning model 208 may recognize that the phrase "That's the last time" indicates a negative sentiment.

Every time the user of the automotive dealership is presented with a digital media communication, the user may give feedback (e.g., input, etc.) on the presented digital media communication. The user feedback creates a feedback loop, which may constantly improve the deep learning model 208, which, in turn, may improve other aspects of the scoring system 102, such as the scoring engine 206, the rescoring engine 210, the classification engine 204, etc.

Detailed Description of Exemplary Embodiments

Figure 3:
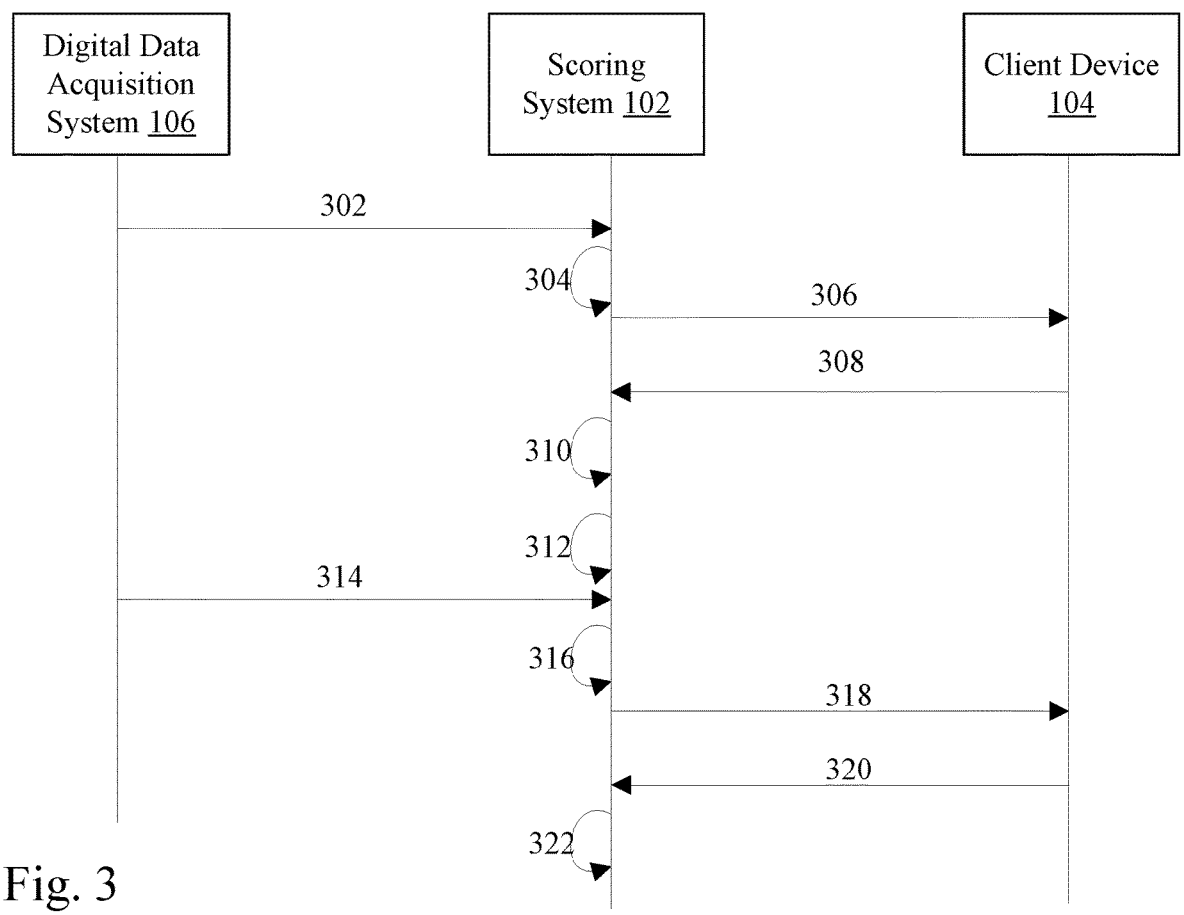
FIG. 3 is a sequence diagram illustrating an example flow of data and/or operations, according to a preferred embodiment of the invention.

FIG. 3 illustrates a sequence diagram 300 illustrating an example flow of data and/or operations between the digital data acquisition system 106 and the scoring system 102 and between the scoring system 102 and the feedback device 104. The scoring system 102 may receive information from and/or send information to the digital data acquisition system 106 via the digital data acquisition system interface 200 in FIG. 2. The scoring system 102 may receive information from and/or send information to the feedback device 104 via the feedback device interface 214 in FIG. 2.

At 302, the digital data acquisition system 106 may transmit a training dataset to the scoring system 102. At 304, the scoring system 102 may score the training dataset. For example, the scoring engine 206 in FIG. 2 may assign a score to a portion or all of the training dataset. As explained above, the score may indicate a likelihood that an author of a respective entry in the training dataset is to purchase a product and/or service. At 306, the scoring system 102 may provide the training dataset to the feedback device 104. A user of the feedback device 104 may review the training dataset and give input for a portion or all of the training dataset. As explained above, the input may indicate a likelihood that an author of a respective entry in the training dataset is to purchase a product and/or service. At 308, the feedback device 104 may provide the user input to the scoring system 102.

At 310, the scoring system 102 may rescore the training dataset based on the input. For example, the rescoring engine 210 in FIG. 2 may rescore the training dataset based on the input. As explained above, the rescore may indicate a likelihood that an author of a respective entry in the training dataset is to purchase a product and/or service. At 312, the deep learning model 208 in FIG. 2 may be created based, at least in part, on the rescored training dataset. The scoring engine 206 may be updated by the deep learning model 208.

At 314, the scoring system 102 may receive a digital media post from the digital data acquisition system 106. At 316, the digital media post may be scored by the scoring system 102. For example, the scoring engine 206 may score the digital media post. As explained above, the score may indicate a likelihood that an author of the digital media post is to purchase a product and/or service. At 318, the scoring system 102 may send the digital media post to the feedback device 104. The user of the feedback device 104 may review the digital media post and give input for the digital media post. As explained above, the input may indicate a likelihood that an author of the digital media post is to purchase a product and/or service. At 320, the feedback device 104 may provide the user input to the scoring system 102.

At 322, the scoring system 102 may rescore the digital media post based on the input. For example, the rescoring engine 210 may rescore the digital media post based on the input. As explained above, the rescore may indicate a likelihood that an author of the digital media post is to purchase a product and/or service. The deep learning model 208 may be updated based, at least in part, on the rescored digital media post. The scoring engine 206 may be updated by the updated deep learning model 208.

Figure 4:
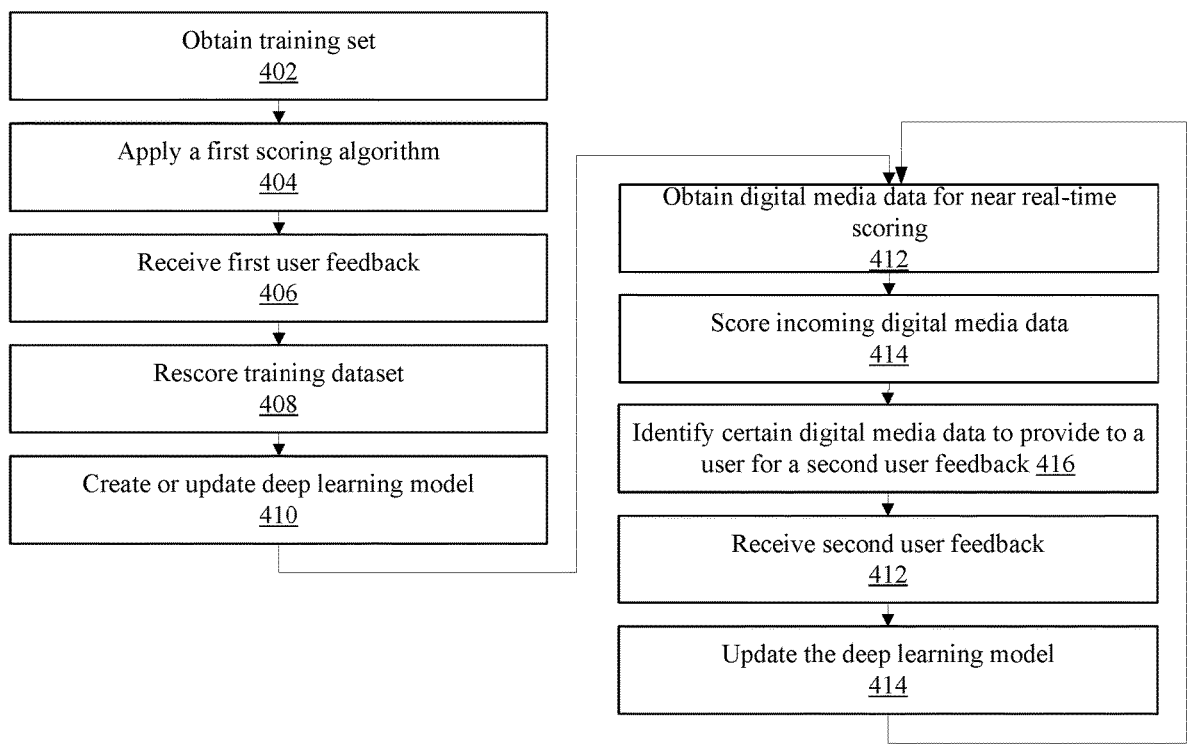
FIG. 4 is a flow diagram illustrating an example method, according to a preferred embodiment of the invention.

FIG. 4 illustrates a flow diagram 400 of an example method in accordance with the present disclosure. At 402, a training dataset may be obtained. For example, the scoring system 102 in FIG. 1 may obtain a training dataset.

At 404, a first scoring algorithm may be applied for each entry in the training dataset to obtain a first score. For example, the scoring system 102 in FIG. 1 may apply a first scoring algorithm to obtain a first score for each entry in the training dataset. The first score may indicate the likelihood that a prospective customer will buy an offering. The first scoring algorithm may use pre-identified keywords and deep learning and/or NLP models to identify context suggesting a purchase intent associated with each entry, including whether the entry indicates a need for an offering, whether the need is immediate, or whether the entry requests a recommendation. In one non-limiting example, at least 2,000 entries in the training dataset may be scored by a first scoring algorithm. In another non-limiting example, at least 60 or 70% of the entries scored by the first scoring algorithm may be labeled as expressing a highest buying intent.

At 406, one or more scores may be received from a user for one or more entries in the training dataset. For example, the training dataset that is scored by a first scoring algorithm may also be provided to a user. The user may score one or more entries in the training dataset, and the user provided scores may be received at 406. In one embodiment, the scoring system 102 in FIG. 1 may receive one or more scores from a user via the feedback device 104 in FIG. 1 for one or more entries in the training dataset.

At 408, the training dataset may be rescored based on the one or more scores received from the user. For example, the scoring system 102 in FIG. 1 may rescore the training dataset based on the one or more scores received from the user via the feedback device 104 in FIG. 1. In one non-limiting example, the at least 10% of the entries scored by the first scoring algorithm may be rescored 408. A variety of different rescoring methodologies may be used, including batch scoring or bulk scoring, etc.

At 410, a deep learning model may be created based on the rescored dataset. For example, the scoring system 102 in FIG. 1 may create a deep learning model based on the rescored dataset. The deep learning model may comprise a library of words, phrases, and contextual relationship between one or more items in the library indicating a likelihood that a prospective customer will purchase an offering. The relationship used by the deep learning model may comprise the presence or absence of certain words or phrases in the library. The relationship used by the deep learning model may comprise the order in which the words or phrases appear.

At 412, digital media posts may be obtained. For example, the scoring system 102 in FIG. 1 may obtain digital media posts. The digital media posts may comprise data from one or more digital media platforms. The one or more digital media platforms may comprise one or more of digital social media platforms, digital message boards, and digital review collection systems. Obtaining digital media posts may comprise using one or more of application programming interfaces (APIs) associated with one or more digital media platforms, and screen scraping and text recognition technologies.

At 414, each received digital media post may be scored by using the deep learning model. For example, the scoring system 102 in FIG. 1 may score each received digital media post by using the deep learning model. The scores may indicate the likelihood that a customer will purchase an offering.

At 416, certain scored digital media posts may be provided to the user. For example, the scoring system 102 in FIG. 1 may provide certain scored digital media posts to the user. In one non-limiting example, the user may be provided scored digital media posts only if the posts are scored as having a high likelihood that a potential customer will purchase an offering.

At 418, a second score may be received from the user. For example, the scoring system 102 in FIG. 1 may receive a second score from the user via the feedback device 104 in FIG. 1. The second score indicating the likelihood that a customer will buy an offering based on the content of the digital media post.

At 420, the deep learning model may be updated based on the second score. For example, the scoring system 102 in FIG. 1 may update the deep learning model based on the second score. In one non-limiting example, wherein the user is provided with posts having a high buying intent, the deep learning model may be updated with the second score if the second score indicates a low likelihood that a potential customer will purchase an offering. In one embodiment of the invention, if a user provides a second score that indicates a low likelihood that a user will purchase an offering, then the deep learning model may be updated immediately. Conversely, the model may be updated 420 with scores indicating a high buying intent after a certain amount of posts receiving high second score are received. In a non-limiting example, at least 5,000 posts receiving a high second score must be received 418 before the model is updated 420. In one embodiment of the invention, if a second score provided by a user 418 is the same as the NLP 416 scored entries, then the model may not be updated. If the second score provided by a user 418 is different than the one scored using the NLP model 416, then the deep learning model 420 may be updated. In one embodiment of the invention, the model 420 may be updated in include certain words or phrases, and/or may be updated to exclude certain words or phrases. In other non-limiting examples, the model may be updated 420 to include the order or the position of words within phrases or sentences. The model may also be updated 420 to include the distance between two or more words or phrases within a phrase or a sentence. Other methodologies for updating the deep learning model 420 may be used, as would be readily apparent to a person of ordinary skill in the art, without departing from the scope of the invention.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
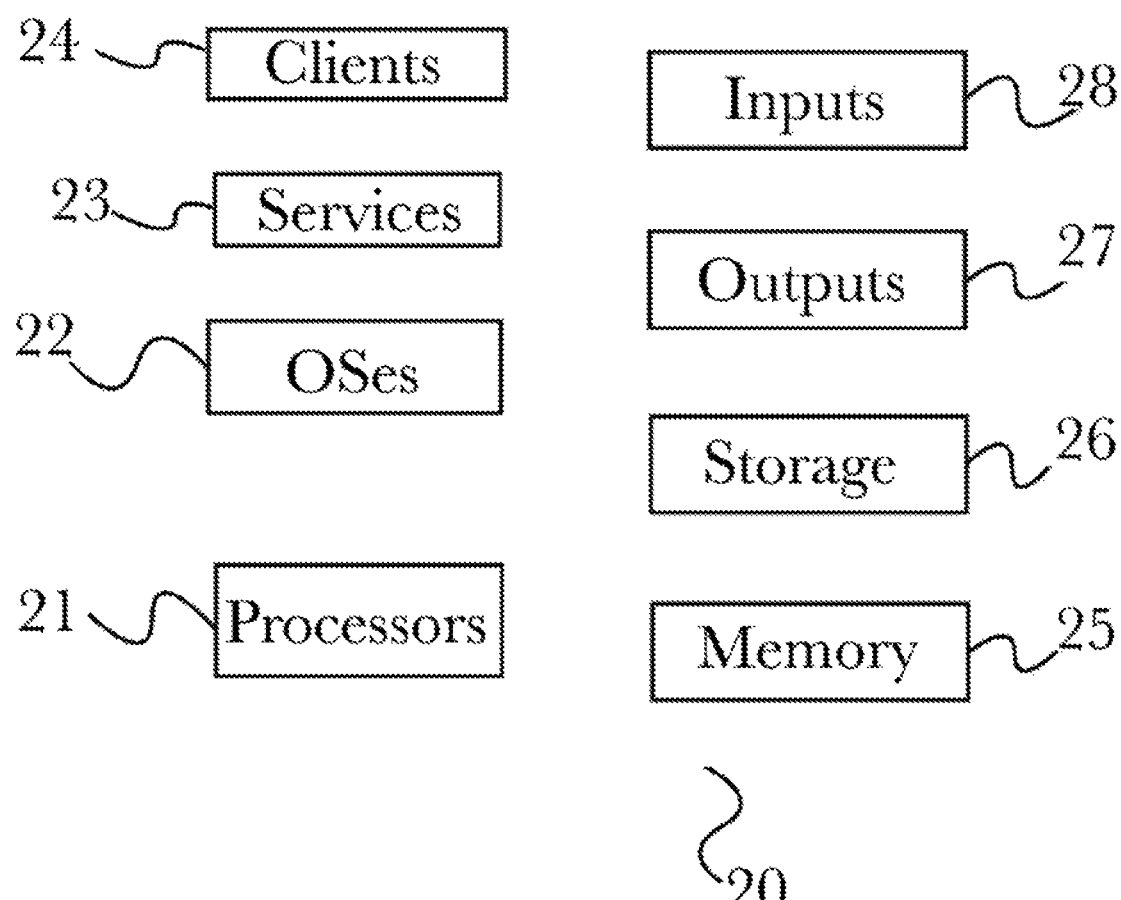
FIG. 6 is a block diagram illustrating an exemplary logical architecture for a client device, according to a preferred embodiment of the invention.

In some embodiments, systems may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
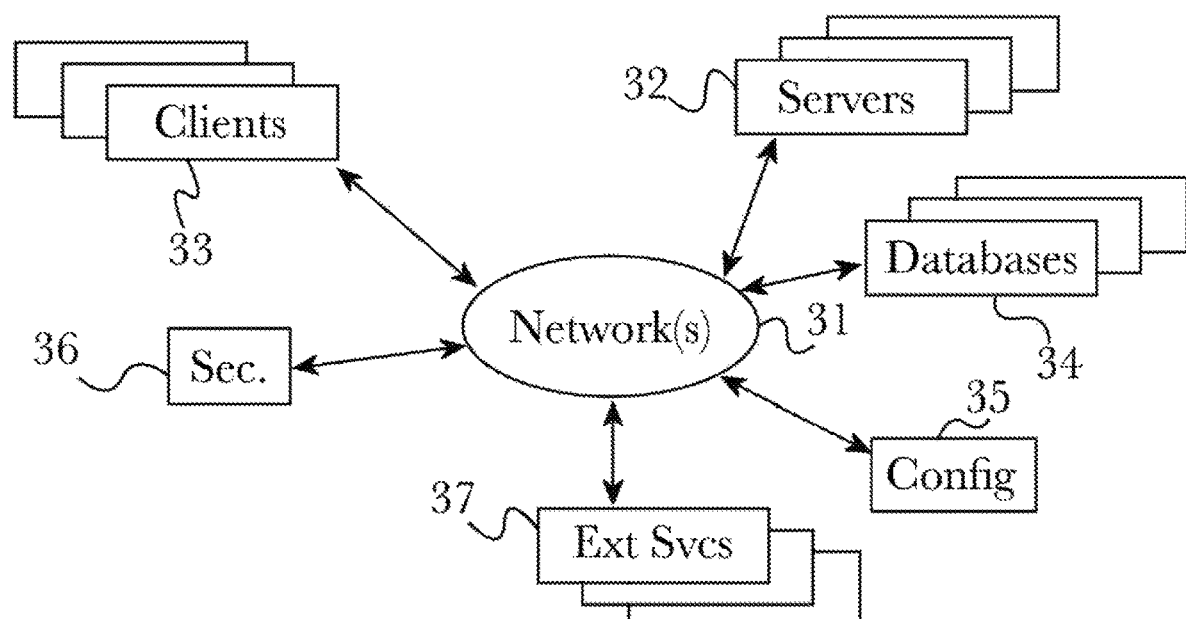
FIG. 7 is a block diagram showing an exemplary architectural arrangement of clients, servers, and external services, according to a preferred embodiment of the invention.

In some embodiments, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 2-3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope described in the foregoing specification.

What is claimed is:

1. A computer program product comprising a non-transitory computer readable storage medium having instructions encoded thereon that, when executed by a processor, cause the processor to:
   obtain, from a memory of a computing device, a training dataset;
   apply, using the processor, a first scoring algorithm to obtain a first score for each entry in the training dataset, the first score indicating the likelihood that a prospective purchaser will buy an offering;
   receive one or more scores from a user for one or more entries in the training dataset, the user being an entity that sells one or more products and/or services;
   rescore, by the processor, the training dataset based on the one or more scores received from the user;
   create, by the processor, a deep learning model based on the rescored dataset, the deep learning model comprising a library of words, phrases, and contextual relationship between one or more items in the library indicating, upon comparison to a written digital media post by the prospective purchaser, a likelihood that the prospective purchaser will purchase an offering;
   obtain digital media posts, made by prospective purchasers, comprising data from one or more external digital media platforms, the posts containing written positive indications of a desire, need or occasion to purchase;
   score, using the processor, each received digital media post in accordance with the deep learning model to produce a set of scored digital media posts indicating the likelihood that the prospective purchaser will purchase an offering;
   provide the set of scored digital media posts to the user;
   receive, in the memory, a second score from the user, the second score based upon the user modifying the set of scored digital media posts, the second score indicating the likelihood that the prospective purchaser will buy an offering based on the content of the set of scored digital media posts;
   update, using the processor, the deep learning model based on the second score only if the second score is different from the score associated with at least one of the set of scored digital media posts; and
   maintaining the second score without the update when the score associated with the at least one of the set of scored digital media posts is same as the second score.

2. A computer-implemented method performed in a computing device, the method comprising:
   obtaining, in a memory of the computing device, a training dataset;
   applying, using a processor of the computing device, a first scoring algorithm to obtain a first score for each entry in the training dataset, the first score indicating the likelihood that a prospective purchaser will buy an offering;
   receiving one or more scores from a user for one or more entries in the training dataset, the user being an entity that sells one or more products and/or services;
   rescoring, using the processor, the training dataset based on the one or more scores received from the user;
   creating, using the processor, a deep learning model based on the rescored dataset, the deep learning model comprising a library of words, phrases, and contextual relationship between one or more items in the library indicating, upon comparison to a digital media post by the prospective purchaser, a likelihood that a prospective customer will purchase an offering;
   obtaining, using the processor, digital media posts, made by prospective purchasers, comprising data from one or more external digital media platforms, the posts containing positive indications of a desire, need or occasion to purchase;
   scoring, using the processor, each received digital media post in accordance with the deep learning model to produce a set of scores indicating the likelihood that the prospective purchaser will purchase an offering;
   providing, by the processor, the set of scores to the user;
   receiving, in the memory, a second score from the user, the second score based upon the user modifying the set of scored digital media posts, the second score indicating the likelihood that the prospective purchaser will buy an offering based on the content of the digital media post associated with the set of scores;
   updating, by the processor, the deep learning model based on the second score only if the second score is different from the score associated with at least one of the set of scores; and
   maintaining the second score without the update when the score associated with the at least one of the set of scores is same as the second score.

3. The method of claim 2, wherein the first scoring algorithm uses pre-identified keywords and deep learning to identify context suggesting a purchase intent associated with each entry, including whether the entry indicates a need for an offering, whether the need is immediate, or whether the entry requests a recommendation.

4. The method of claim 2, wherein the one or more digital media platforms comprise one or more of digital social media platforms, digital message boards, and digital review collection systems.

5. The method of claim 2, wherein obtaining digital media posts comprises using one or more of application programming interfaces (APIs) associated with one or more digital media platforms, and screen scraping and text recognition technologies.

6. The method of claim 2, wherein the user is provided scored digital media posts only if the posts are scored as having a high likelihood that a potential purchaser will purchase an offering.

7. The method of claim 2, wherein the deep learning model is updated with the second score if the second score indicates a low likelihood that a potential purchaser will purchase an offering.

8. The method of claim 2, wherein the relationship used by the deep learning model comprises the presence or absence of certain words or phrases in the library.

9. The method of claim 2, wherein the relationship used by the deep learning model comprises the order in which the words or phrases appear.

* * * * *